United States Patent
Hirata

(10) Patent No.: US 10,384,250 B2
(45) Date of Patent: Aug. 20, 2019

(54) METHOD FOR FORMING METAL PLATE AND APPARATUS FOR FORMING METAL PLATE

(71) Applicant: TOYOTA BOSHOKU KABUSHIKI KAISHA, Aichi-ken (JP)

(72) Inventor: Kazuyuki Hirata, Toyota (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/194,929

(22) Filed: Jun. 28, 2016

(65) Prior Publication Data

US 2017/0008058 A1 Jan. 12, 2017

(30) Foreign Application Priority Data

Jul. 6, 2015 (JP) .................... 2015-135536

(51) Int. Cl.
   *B21D 13/02* (2006.01)
   *B21D 53/04* (2006.01)
   *H01M 8/0208* (2016.01)
   *H01M 8/021* (2016.01)
   *H01M 8/0254* (2016.01)

(52) U.S. Cl.
   CPC ............ *B21D 13/02* (2013.01); *B21D 53/04* (2013.01); *H01M 8/021* (2013.01); *H01M 8/0208* (2013.01); *H01M 8/0254* (2013.01)

(58) Field of Classification Search
   CPC .... B21D 13/02; B21D 53/022; B21D 53/025; B21D 53/04; B21D 17/02; B21D 11/02; B21D 22/20; B21D 22/26; B21D 22/30
   See application file for complete search history.

(56) References Cited

U.S. PATENT DOCUMENTS

| | | | | |
|---|---|---|---|---|
| 2,741,834 A * | 4/1956 | Reed | ..................... | B21D 13/02 72/374 |
| 8,828,622 B2 * | 9/2014 | Fujimura | ............... | H01M 8/026 72/352 |
| 9,227,239 B2 * | 1/2016 | Hirata | .................... | B21D 13/02 |
| 9,630,229 B2 * | 4/2017 | Hirata | .................... | B21D 13/02 |
| 9,662,700 B2 * | 5/2017 | Taguchi | ................ | B21D 13/02 |

(Continued)

FOREIGN PATENT DOCUMENTS

FR 2941635 A1 * 8/2010 ............. B21D 22/26
JP 2000-317531 11/2000

(Continued)

OTHER PUBLICATIONS

EPO Machine Translation of FR 2941635 A1.*

(Continued)

*Primary Examiner* — Pradeep C Battula
(74) *Attorney, Agent, or Firm* — Greenblum & Bernstein, P.L.C.

(57) ABSTRACT

A method for forming bulging portions on a metal plate by performing cold-pressing on the metal plate is provided. The method includes a first step and a second step. In the first step, a pre-formed body including pre-formed bulging portions is formed with a first die. Each pre-formed bulging portion includes sidewalls. Each sidewall includes dents. In the second step, the sidewalls are pressed by a second die so that the dents of the pre-formed body disappear.

7 Claims, 5 Drawing Sheets

(56) References Cited

U.S. PATENT DOCUMENTS

| | | | | |
|---|---|---|---|---|
| 2011/0229689 A1* | 9/2011 | Giang | ................... | B21D 13/02 |
| | | | | 72/379.6 |
| 2012/0055223 A1 | 3/2012 | Watanabe et al. | | |
| 2014/0352395 A1* | 12/2014 | Hirata | ................... | B21D 13/02 |
| | | | | 72/478 |
| 2015/0290692 A1* | 10/2015 | Hirata | ................... | B21D 13/02 |
| | | | | 72/379.6 |

FOREIGN PATENT DOCUMENTS

| | | |
|---|---|---|
| JP | 5573511 | 8/2014 |
| JP | 2014-213343 | 11/2014 |

OTHER PUBLICATIONS

JPO translation of JP 2000317531 A; dated Oct. 2018.*
Japanese Office Action issued in Japan Counterpart Patent Appl No. 2015-135536 dated Oct. 9, 2018, along with English translation thereof.

* cited by examiner

Fig.7A
Fig.7B
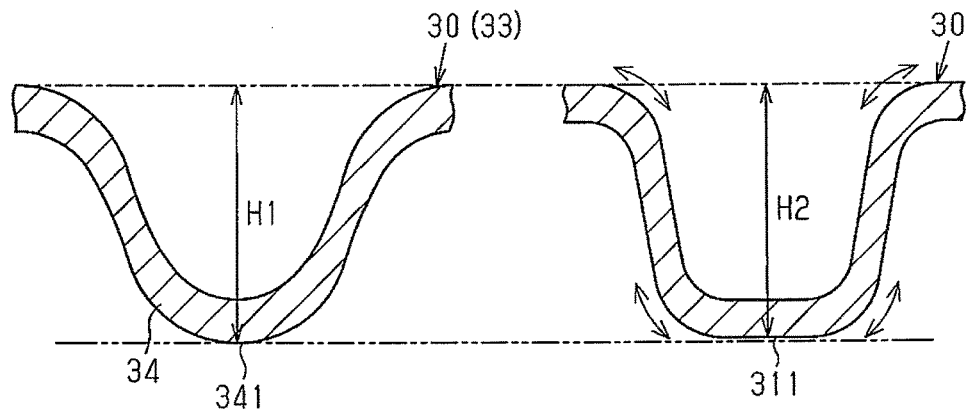
Fig.8
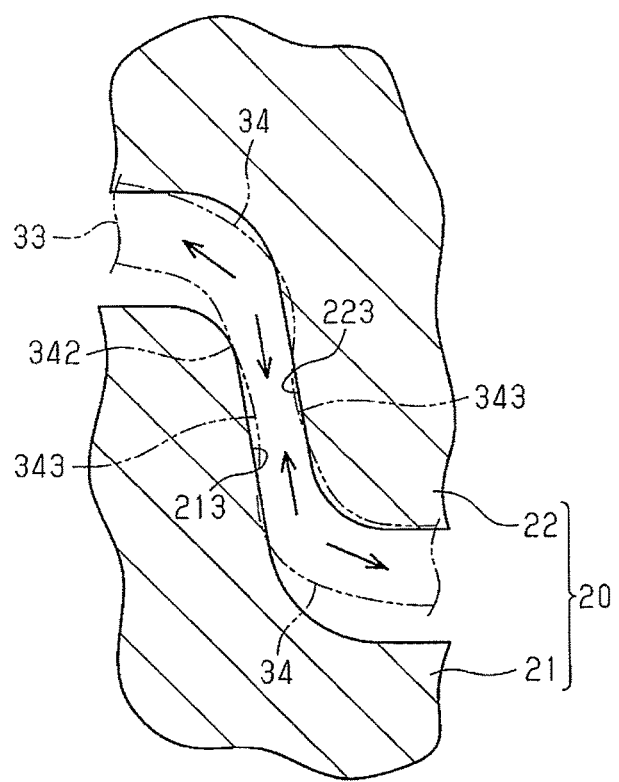

METHOD FOR FORMING METAL PLATE AND APPARATUS FOR FORMING METAL PLATE

BACKGROUND OF THE INVENTION

The present invention relates to a method and an apparatus for forming bulging portions on a metal plate by performing cold-pressing on the metal plate with a die including a die block and a punch.

A conventional fuel-cell separator includes bulging portions provided on a metal plate to form a flow passage through which gas such as hydrogen and oxygen, coolant, or the like flows. For example, Japanese Patent No. 5573511 and Japanese Laid-Open Patent Publication No. 2014-213343 disclose methods for forming a fuel-cell separator.

According to the forming method disclosed in Japanese Patent No. 5573511, as shown in FIG. 9, a die block 41 and a punch 42, which constitute a die 40, press sidewalls 512 of bulging portions 51 of a metal plate 50 while being separated from the tops 511 of the bulging portions 51.

According to the forming method disclosed in Japanese Laid-Open Patent Publication No. 2014-213343, as shown in FIG. 10A, in a first step, the die block 61 and the punch 62 of a first die 60 forms bulging portions 81 on a metal plate 80. At this time, the top 811 of each bulging portion 81 is configured to be thinner than other portions. Next, in a second step, as shown in FIG. 10B, the die block 71 and the punch 72 of a second die 70 press the sidewalls 812 of the bulging portions 81. Then, in a third step, the die block and the punch of a third die, which are not illustrated, shape the sidewalls 812 of the bulging portions 81 in a vertical direction and expand the tops 811 of the bulging portions 81.

SUMMARY OF THE INVENTION

To make the cross-sections of bulging portions more closely match rectangular shapes, more load is required to press the sidewalls of the bulging portions. As a result, a problem arises that the forming apparatus needs to be highly durable.

Particularly, it is preferable for a fuel-cell separator, for example, to have a large cross-sectional area in view of improving the output efficiency of the fuel cell so that gas such as hydrogen and oxygen easily flows through the flow passage. Thus, it is desired that the cross-sections of bulging portions closely match rectangular shapes.

It is an objective of the present invention to provide a method and an apparatus for forming a metal plate that allows the forming load to be reduced.

To achieve the above objective, a method for forming a metal plate is a method in which bulging portions are formed on a metal plate by performing cold-pressing on the metal plate using at least one die including a die block and a punch. The at least one die includes a first die and a second die. The method includes a first step of forming a pre-formed body including pre-formed bulging portions with the first die. Each pre-formed bulging portion includes sidewalls, and each sidewall includes a dent. The method further includes a second step of pressing the sidewalls with the second die so that the dents of the pre-formed body disappear.

To achieve the above objective, an apparatus for forming a metal plate includes at least one die including a die block and a punch. With the at least one die, bulging portions are formed on a metal plate by performing cold-pressing on the metal plate. The at least one die includes a first die and a second die. The first die forms a pre-formed body including pre-formed bulging portions. Each pre-formed bulging portion includes sidewalls, and each sidewall includes a dent. The second die presses the sidewalls so that the dents of the pre-formed body disappear.

BRIEF DESCRIPTION OF THE DRAWINGS

FIG. 7A is a partial cross-sectional view of the metal plate after the first step.

FIG. 7B is a partial cross-sectional view of the metal plate after the second step.

FIG. 8 is an explanatory partial cross-sectional view illustrating a state of the second step, showing operation of the embodiment.

DETAILED DESCRIPTION OF THE PREFERRED EMBODIMENTS

With reference to FIGS. 1 to 8, one embodiment will now be described. A method and an apparatus for forming a metal plate according to the present embodiment are applied to production of a fuel-cell separator.

Figure 1:
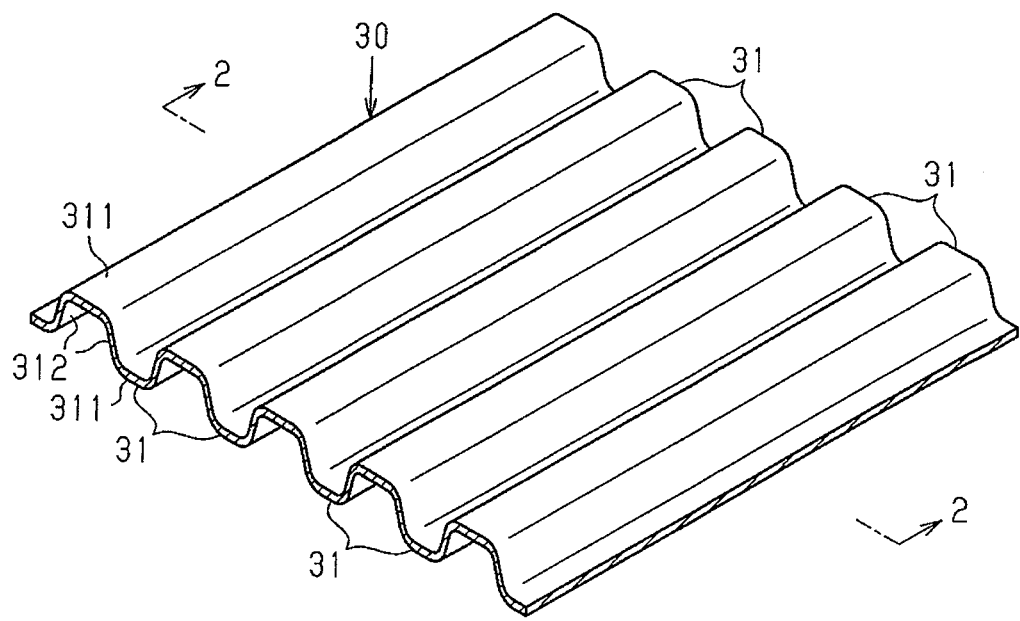
FIG. 1 is a perspective view of a fuel-cell separator formed by a method for forming a metal plate according to one embodiment.
Figure 2:
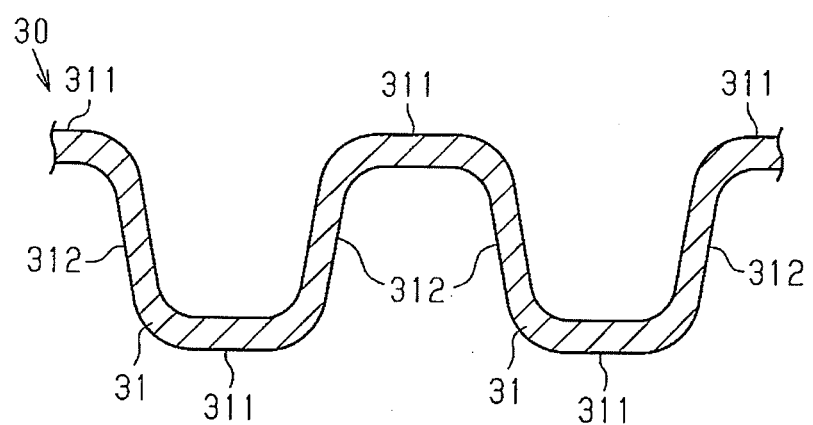
FIG. 2 is a partially enlarged cross-sectional view taken along line 2-2 of FIG. 1.

As shown in FIGS. 1 and 2, a metal plate 30, which constitutes a fuel-cell separator, includes bulging portions 31 on the front surface and the back surface (the top surface and the bottom surface in FIG. 2). The bulging portions 31 project toward the front side or the back side so that the metal plate 30 has a pleated shape. The bulging portions 31 are alternately formed on the front surface and on the back surface such that one bulging portion 31 on the back surface side is located between two adjacent bulging portions 31 on the front surface side.

Each of the bulging portions 31 includes a top 311 that is located at the front end in the projecting direction (the vertical direction of FIG. 2) and two sidewalls 312 that are continuous from the two ends of the top 311 and are inclined with respect to the flat portion at the center of the top 311. Thus, each bulging portion 31 has a substantially trapezoidal cross-section that is perpendicular to the extending direction of the bulging portion 31. The cross-section tapers toward the front side in the projecting direction. Thus, each bulging portion 31 on the front surface side shares the corresponding sidewalls 312 with the adjacent bulging portions 31 on the back surface side. Each bulging portion 31 includes curved portions between the flat portion of the top 311 and the sidewalls 312. The metal plate 30 shown in FIGS. 1 and 2 has entirely uniform thickness.

The material used for the metal plate 30 is excellent in corrosion resistance, and is, e.g., titanium, titanium alloys, or stainless steel. In the present embodiment, titanium is used.

Figure 3:
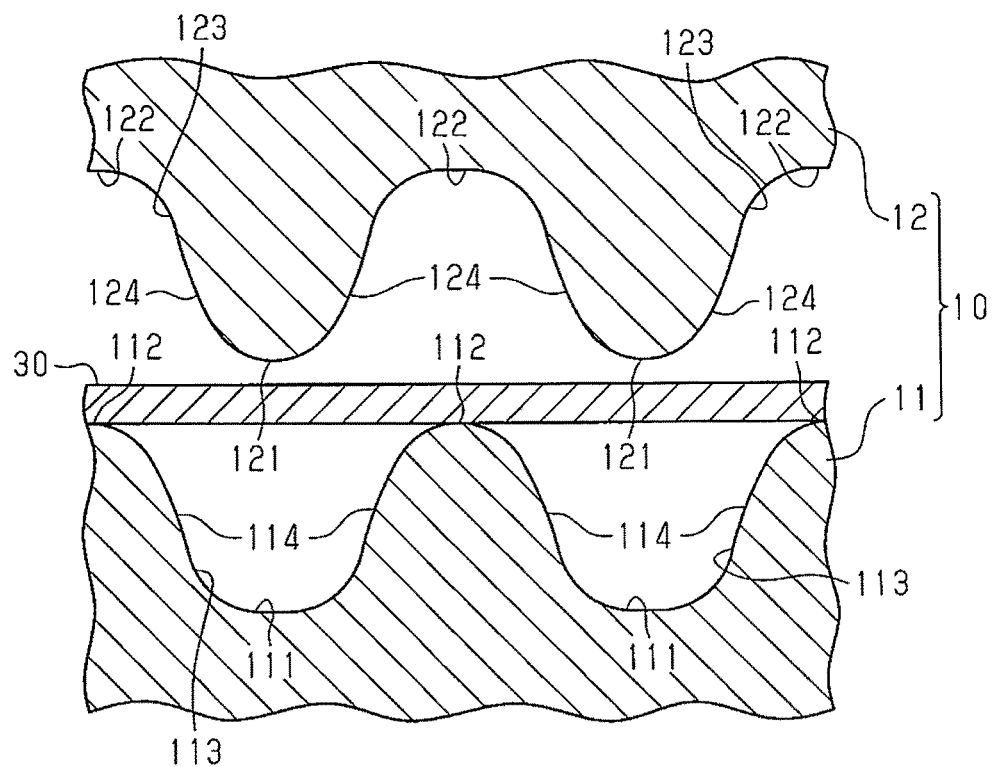
FIG. 3 is a partial cross-sectional view illustrating a first step in the forming method according to the embodiment.

Such a fuel-cell separator is formed by cold-pressing on the flat sheet-shaped metal plate 30 shown in FIG. 3. The metal plate 30 before being formed has a uniform thickness.

Figure 5:
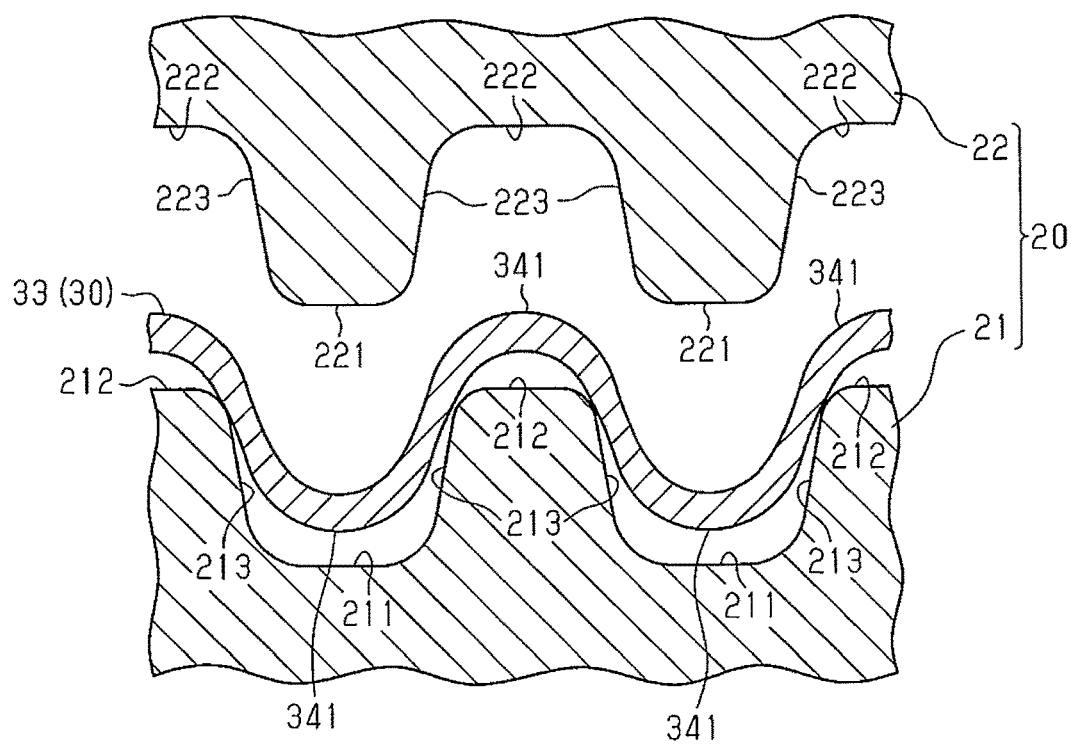
FIG. 5 is a partial cross-sectional view illustrating a second step in the forming method according to the embodiment.

FIGS. 1 and 2 show the metal plate 30 formed in a first step and a second step in the present embodiment. FIG. 3 shows a first die 10 used in the first step, and FIG. 5 shows a second die 20 used in the second step.

As shown in FIG. 3, the first die 10 includes a first die block 11 and a first punch 12. The first punch 12 is allowed to approach or be separated from the first die block 11.

The first die block 11 includes recesses 111 and projections 112, which are alternately arranged on the upper surface. The first punch 12 includes projections 121 and recesses 122, which are alternately arranged on the lower surface. The projections 121 correspond to the respective recesses 111 of the first die block 11, and the recesses 122 correspond to the respective projections 112 of the first die block 11.

Each recess 111 and each projection 112 of the first die block 11 have curved surfaces. Each projection 112 and the adjacent recesses 111 are connected with oblique surfaces 113, each of which includes a first convex portion 114. The first convex portion 114 is located in the central portion of the oblique surface 113 in the projecting direction of the corresponding projection 112 (the vertical direction of FIG. 3). Thus, the upper surface of the first die block 11 includes curved surfaces having different curvature radiuses.

Each projection 121 and each recess 122 of the first punch 12 have curved surfaces. Each recess 122 and the adjacent projections 121 are connected with oblique surfaces 123, each of which includes a second convex portion 124. The second convex portion 124 is located in the central portion of the oblique surface 123 in the projecting direction of the corresponding projection 121 (the vertical direction of FIG. 3). Thus, the lower surface of the first punch 12 includes curved surfaces having different curvature radiuses.

In the present embodiment, the curvature radiuses of the first convex portions 114 of the first die block 11 and the curvature radiuses of the second convex portions 124 of the first punch 12 are set to be the same as each other.

As shown in FIG. 5, the second die 20 includes a second die block 21 and a second punch 22. The second punch 22 is allowed to approach or be separated from the second die block 21.

The second die block 21 includes recesses 211 and projections 212, which are alternately arranged on the upper surface. The second punch 22 includes projections 221 and recesses 222, which are alternately arranged on the lower surface. The projections 221 correspond to the respective recesses 211 of the second die block 21, and the recesses 222 correspond to the respective projections 212 of the second die block 21.

The central portion of each recess 211 of the second die block 21 has a planer shape that is perpendicular to the moving direction of the second punch 22 (the vertical direction of FIG. 5). The central portion of each projection 212 of the second die block 21 has a planer shape that is perpendicular to the moving direction of the second punch 22 (the vertical direction of FIG. 5). Each projection 212 and the adjacent recesses 211 are connected with oblique surfaces 213, each of which is planer shaped. A portion between each oblique surface 213 and the corresponding recess 211 and a portion between the oblique surface 213 and the corresponding projection 212 are curved.

The central portion of each projection 221 of the second punch 22 has a planer shape that is perpendicular to the moving direction of the second punch 22 (the vertical direction of FIG. 5). The central portion of the recess 222 of the second punch 22 has a planer shape that is perpendicular to the moving direction of the second punch 22 (the vertical direction of FIG. 5). Each recess 222 and the adjacent projections 221 are connected with oblique surfaces 223, each of which is planer shaped. A portion between each oblique surface 223 and the corresponding projection 221 and a portion between the oblique surface 223 and the corresponding recess 222 are curved.

Therefore, the central portion of each recess 211 of the second die block 21 is parallel to the central portion of the corresponding projection 221 of the second punch 22. The central portion of each projection 212 of the second die block 21 is parallel to the central portion of the corresponding recess 222 of the second punch 22. In addition, each oblique surface 213 of the second die block 21 is parallel to the corresponding oblique surface 223 of the second punch 22.

A forming method according to the present embodiment and operation of the present embodiment will now be described together.

Figure 4:
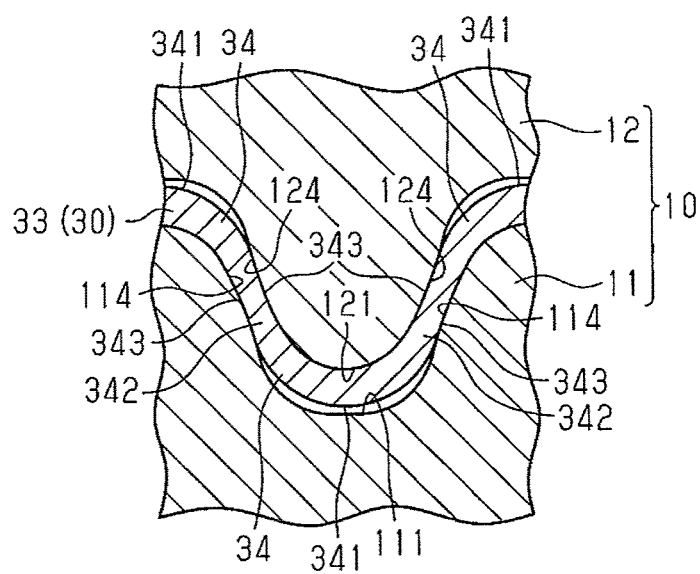
FIG. 4 is a partial cross-sectional view illustrating a state of the first step.

As shown in FIG. 3, in the first step, a flat sheet-shaped metal plate 30 is placed on the first die block 11 of the first die 10. In this state, the first punch 12 is lowered to approach the first die block 11. This causes the metal plate 30 to alternately project on the back surface side (the lower side of FIG. 3) and the front surface side (the upper side of FIG. 3) at predetermined intervals between the recesses 111 of the first die block 11 and the respective projections 121 of the first punch 12 and between the projections 112 of the first die block 11 and the respective recesses 122 of the first punch 12 to form pre-formed bulging portions 34 as shown in FIG. 4. At this time, the top portion 341 of each pre-formed bulging portion 34 is stretched by pressing force of the corresponding projection 121 of the first punch 12 or the corresponding projection 112 of the first die block 11, and the corresponding sidewalls 342 are formed at two sides of the top portion 341. Furthermore, each sidewall 342 includes curved dents 343 on the two surfaces. The curved dents 343 are formed by being pressed by the first convex portion 114 of the corresponding oblique surface 113 of the first die block 11 and the second convex portion 124 of the oblique surface 123 of the first punch 12 that face the first convex portion 114. The curved dents 343 are located on the central portion of the sidewall 342 in the projecting direction of the pre-formed bulging portions 34 (the vertical direction of FIG. 4). In this way, a pre-formed body 33 is formed. Therefore, due to the dents 343, each sidewall 342 of the pre-formed body 33 reduces in thickness toward the center in the projecting direction of the pre-formed bulging portions 34.

As shown in FIG. 4, when the first punch 12 is located at the lowest point, gaps are formed between the metal plate 30 (the pre-formed body 33) and the inner ends of the recesses 111 in the first die block 11 and between the metal plate 30 (the pre-formed body 33) and the inner ends of the recesses 122 in the first punch 12. The inner ends of the recesses 111 and 122 may be slightly in contact with the metal plate 30 as long as pressing force, i.e., forming pressure, is not applied to the metal plate 30.

Figure 6:
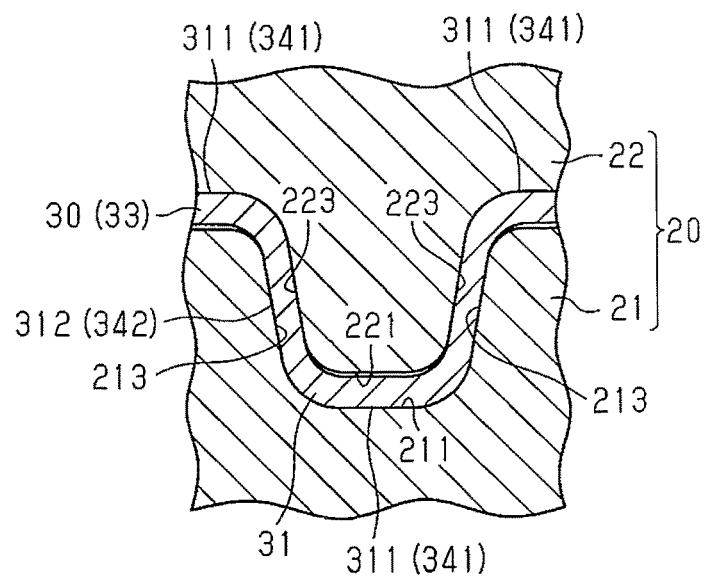
FIG. 6 is a partial cross-sectional view illustrating a state of the second step.
Figure 9:
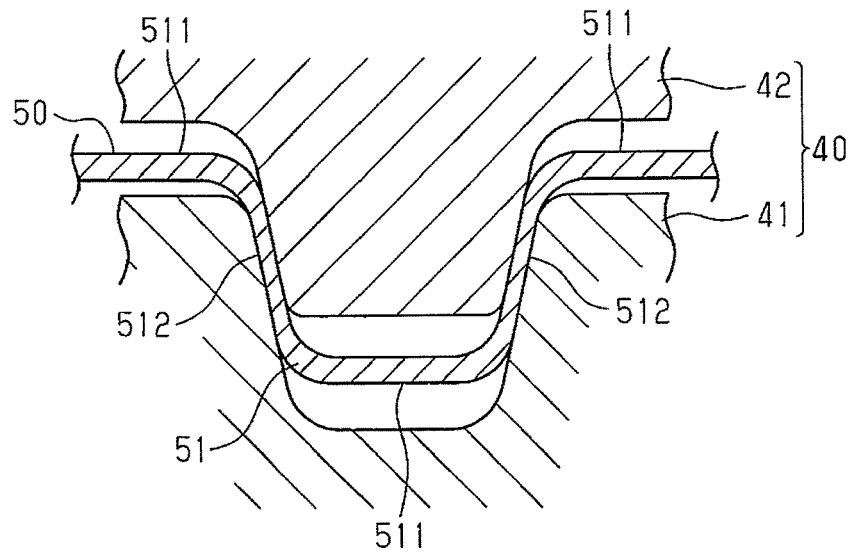
FIG. 9 is a partial cross-sectional view illustrating a forming method disclosed in Japanese Patent No. 5573511.
Figure 10A:
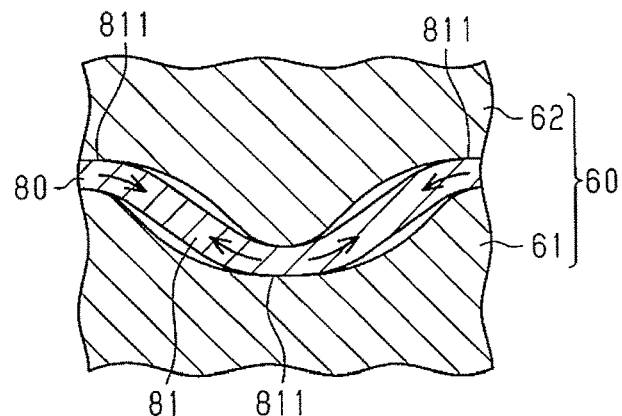
FIG. 10A is a partial cross-sectional view illustrating a first step of a forming method disclosed in Japanese Laid-Open Patent Publication No. 2014-213343.
Figure 10B:
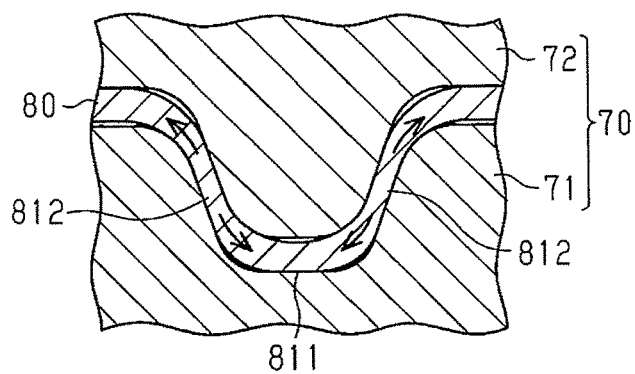
FIG. 10B is a partial cross-sectional view illustrating a second step of a forming method disclosed in Japanese Laid-Open Patent Publication No. 2014-213343.

As shown in FIG. 5, in the second step, the pre-formed body 33 is placed on the second die block 21 of the second die 20. In this state, the second punch 22 is lowered to approach the second die block 21. Thus, as shown in FIG. 6, the pre-formed bulging portions 34 of the pre-formed body 33 are pressed along the forming surface of the second die block 21 and the forming surface of the second punch 22. Thus, as shown in FIGS. 7A and 7B, the height H2 of each bulging portion 31 in the metal plate 30 after the second step is less than the height H1 of the corresponding pre-formed bulging portion 34 in the metal plate 30 (the pre-formed body 33) after the first step (H2<H1). The top 311 of each bulging portion 31 is expanded more than the top portion 341 of the pre-formed bulging portion 34.

At this time, as shown in FIG. 8, gaps are formed between each sidewall 342 (long dashed two short dashed line) of the pre-formed bulging portions 34 and the corresponding oblique surface 213 (solid line) of the second die block 21 and the corresponding oblique surface 223 (solid line) of the second punch 22 due to the dents 343. Thus, when the oblique surface 213 of the second die block 21 and the oblique surface 223 of the second punch 22 press the sidewall 342, the material located on the opposite sides of the dents 343 moves to approach each other inside the sidewall 342 as indicated by the arrows of FIG. 8. Eventually, the dents 343 disappear. Thus, in contrast to the case in which bulging portions are formed by pressing sidewalls without such recesses, the material inside the sidewall 342 smoothly moves with a small load. Therefore, the load required for pressing is reduced.

As shown in FIGS. 6 and 7B, in the second step, the material that is pressed by the second die block 21 and the second punch 22 moves to curved portions between the top 311 and the sidewalls 312 in each bulging portion 31, so that the portions are filled with the material. Thus, the tension stress applied in directions indicated by the arrows of FIG. 7B is eased to minimize spring-back.

The method and the apparatus for forming a metal plate according to the present embodiment, which is described above, achieve the following advantages.

(1) In the first step, the pre-formed body 33, which includes the pre-formed bulging portions 34, is formed with the first die 10. The pre-formed bulging portions 34 include the sidewalls 342, which include the dents 343. Subsequently, in the second step, the second die 20 presses the sidewalls 342 so that the dents 343 of the pre-formed body 33 disappear.

According to the method, in contrast to the case in which bulging portions are formed on a metal plate by pressing sidewalls without such recesses, the material inside the sidewall 342 smoothly moves with a small load. Therefore, a forming load is reduced.

In addition, in contrast to the case in which bulging portions are formed on a metal plate by pressing sidewalls without such recesses, the material inside the sidewall 342 smoothly moves with a small load, so that tension stress on the sidewalls 312 of the metal plate 30 after forming is reduced. Thus, warp of the metal plate 30 after forming, i.e., a fuel-cell separator, is minimized.

A fuel-cell separator is formed in two steps. Thus, the number of steps is reduced compared to the forming method disclosed in Japanese Laid-Open Patent Publication No. 2014-213343.

(2) In the first step, each sidewall 342 includes the corresponding dents 343 formed on the two surfaces. When the sidewalls 342 of the pre-formed body 33 are pressed by the oblique surfaces 213 of the second die block 21 and the oblique surfaces 223 of the second punch 22 in the second step, the ease in movement of the material inside the sidewall 342 rarely varies between the inner surface and the outer surface. Therefore, warp of the metal plate 30 is effectively minimized.

(3) In the first step, the dents 343 are formed to have curved surfaces. Thus, in the second step, when each sidewall 342 of the pre-formed body 33 is pressed by the corresponding oblique surface 213 of the second die block 21 and the corresponding oblique surface 223 of the second punch 22, material located on the opposite sides of the dents 343 smoothly moves to approach each other inside the sidewall 342. Thus, warp of the metal plate 30 is effectively minimized. In addition, the dents 343 of the pre-formed body 33 are restrained from leaving traces on the respective bulging portions 31 of the metal plate 30.

(4) In the first step, each sidewall 342 of the pre-formed body 33 includes the dents 343 in the central portion in the projecting direction of the pre-formed bulging portions 34.

Such a method limits the occurrence of a difference in the amount of material between one side and the other side of the dents 343 in each of sidewall 342 of the pre-formed body 33. Thus, when each sidewall 342 is pressed by the corresponding oblique surface 213 of the second die block 21 and the corresponding oblique surface 223 of the second punch 22 in the second step, material on one side of the dents 343 and material on the other side of the dents 343 inside the sidewall 342 move to approach each other. At this time, the occurrence of a difference in ease of the movement is limited. Therefore, warp of the metal plate 30 is effectively minimized.

Modifications

The above-illustrated embodiment may be modified, e.g., in the following forms.

The curvature radiuses of the first convex portions 114 of the first die block 11 may differ from the curvature radiuses of the second convex portions 124 of the first punch 12.

In each sidewall 342 of the pre-formed body 33, the dents 343 may be formed on the front side or the back side from the central portion in the projecting direction of the pre-formed bulging portions 34.

Each sidewall 342 of the pre-formed body 33 may include dents 343. The shape of each dent 343 may be modified as necessary.

Each sidewall 342 of the pre-formed body 33 may include a dent 343 on only one surface. Even this case achieves an advantage corresponding to advantage (1).

The invention claimed is:

1. A method for forming a metal plate wherein bulging portions are formed on a metal plate by performing cold-pressing on the metal plate using at least one die including a die block and a punch,
wherein the at least one die includes a first die and a second die,
the method comprising:
forming a pre-formed body including pre-formed bulging portions with the first die, wherein each pre-formed bulging portion includes sidewalls, wherein forming each sidewall includes forming a curved dent defined by a curved surface having a radius of curvature throughout the curved dent in each sidewall, and
pressing the sidewalls with the second die so that the curved surface of each sidewall becomes flat, thereby causing the curved dents of the pre-formed body to disappear.

2. The method for forming a metal plate according to claim 1, wherein
each sidewall includes two surfaces,
the curved dent on each sidewall is formed on one of the two surfaces of the sidewall, and
the forming each sidewall further comprises forming a second curved dent on the other of the two surfaces of each of the sidewalls.

3. The method for forming a metal plate according to claim 2, wherein the curved dents and the second curved dents have the same radius of curvature.

4. The method for forming a metal plate according to claim 2, wherein the curved dents and the second curved dents have different radiuses of curvature from each other.

5. The method for forming a metal plate according to claim 1, wherein each curved dent is formed in a central portion of each sidewall in a projecting direction of the pre-formed bulging portions.

6. A method for forming a metal plate wherein bulging portions are formed on a metal plate by performing cold-pressing on the metal plate using at least one die including a die block and a punch,
wherein the at least one die includes a first die and a second die,
the method comprising:
a first step of forming a pre-formed body including pre-formed bulging portions with the first die, wherein each pre-formed bulging portion includes sidewalls and each sidewall includes a dent, and forming, in the first step, each sidewall such that the sidewall includes a curved surface, wherein the curved surface of each sidewall defines the dent of the sidewall, and
a second step of pressing the sidewalls with the second die so that the dents of the pre-formed body disappear, and pressing, in the second step, the sidewalls with the second die so that the curved surface of each sidewall becomes flat, thereby causing the dents of the pre-formed body to disappear, wherein:
each sidewall includes two surfaces,
the dent on each sidewall is one of a plurality of dents on the sidewall,
the method further comprises forming at least one of the dents on each surface of the sidewall in the first step.

7. The method for forming a metal plate according to claim 6, further comprising, in the first step, forming each dent on the corresponding sidewall in a central portion in a projecting direction of the pre-formed bulging portions.

* * * * *